May 21, 1968

R. J. KLEIN ET AL 3,384,807

LEADING CURRENT CIRCUIT

Filed Nov. 10, 1964

INVENTORS
Richard J. Klein
William R. Archer
BY Gordon W. Cromwell
Woodling, Krost,
Granger and Rust
ATTORNEYS

United States Patent Office

3,384,807
Patented May 21, 1968

3,384,807
LEADING CURRENT CIRCUIT
Richard J. Klein and William R. Archer, Cuba, and Gordon W. Cromwell, Belfast, N.Y., assignors to Acme Electric Corporation, Cuba, N.Y., a corporation of New York
Filed Nov. 10, 1964, Ser. No. 410,200
19 Claims. (Cl. 323—22)

ABSTRACT OF THE DISCLOSURE

A pair of opposed rectifiers supplies a D.C. load from an A.C. source. When the load is capacitive and requires a leading current, the load current must reverse polarity before the load voltage does and the opposite rectifier cannot be turned on for conduction because of this wrong polarity. Accordingly another pair of rectifiers alternately are triggered into conduction to pass load current directly or through a transformer through a bleeder impedance during this latter portion of each half cycle when the load current reverses.

The invention relates in general to a leading current circuit for an alternating voltage source and, more particularly, to a circuit for use with an alternating current regulator which may supply a load requiring a leading current.

In many alternating current regulator circuits the regulator supplies an alternating voltage to a load from an alternating voltage source and the load is regulated in one condition such as for voltage or current. In many cases, the exact type of load is not predictable and the load may require a leading current. Such regulator may include controllable devices such as semi-conductor controlled rectifiers which are controlled as to firing angle in order to control the magnitude of the voltage or the current supply to the load. In my application Ser. No. 188,041 entitled, Regulator Circuit, filed Apr. 17, 1962, now Patent No. 3,263,157, various regulator circuits have been described and the present invention may be utilized with such regulator circuits. In such regulator circuits, first and second pairs of semi-conductor controlled rectifiers are connected to different voltage terminals. Each pair of controlled rectifiers is connected in parallel opposition. One of the first pair of rectifiers may first be fired near the beginning of a half cycle of the incoming voltage which first pair supplies a low voltage to the load. Then, at some selected point in the half cycle, one of the second pair of rectifiers is fired to supply a higher voltage to the load. In such an arrangement, if a leading current is required by the load, then late in each half cycle there will be a period when the current reverses but the supply voltage has not yet reversed. If the oppositely conducting rectifier of the first pair were to be fired at this time to allow this leading current to flow, this would cause a short circuit between the transformer taps or other source of the two voltages. Applying a firing signal to the opposite rectifier of the second pair of allow this current to flow prior to voltage zero time would have such rectifier conducting when the voltage did reverse and it would continue to conduct for the entire next half cycle for a full-on or forward failure loss of control. Accordingly, it is not permissible to have either of these opposing rectifiers of the two pairs of controlled rectifiers to start firing at this time.

Accordingly, an object of the invention is to provide a leading current circuit which may be used with an alternating current load circuit to accommodate a leading current in the load without damage to the alternating current circuit or short circuiting or loss of control.

An object of the invention is to provide a leading current circuit for a system operable from an alternating voltage source.

Another object of the invention is to provide a leading current circuit responsive to a circuit in which current can be sensed and providing a bleeder impedance to receive a portion of the current flowing through the load.

Another object of the invention is to provide a bleeder impedance effectively connected in parallel with the load through a controllable rectifier, with this rectifier controlled in accordance with a means sensing tendency for current to reverse in the load.

Another object of the invention is to provide a voltage sensing means to sense the tendency for voltage to increase across a rectifier supplying a load with this voltage sensing means controlling the flow of current through a bypass for load current.

Another object of the invention is to provide a leading current circuit to maintain substantially sinusoidal load current through a load as supplied from rectifier devices from an operating voltage source.

Another object of the invention is to provide a voltage responsive means responsive to the voltage across a first rectifier supplying a leading current load from an alternating voltage source, with the voltage responsive means controlling a bypass for load current during the period in the latter portion of each half cycle when the leading load current reverses before the applied voltage reverses.

Other objects and a fuller understanding of the invention may be had by referring to the following description and claims, taken in conjunction with the accompanying drawings, in which:

Figure 1:
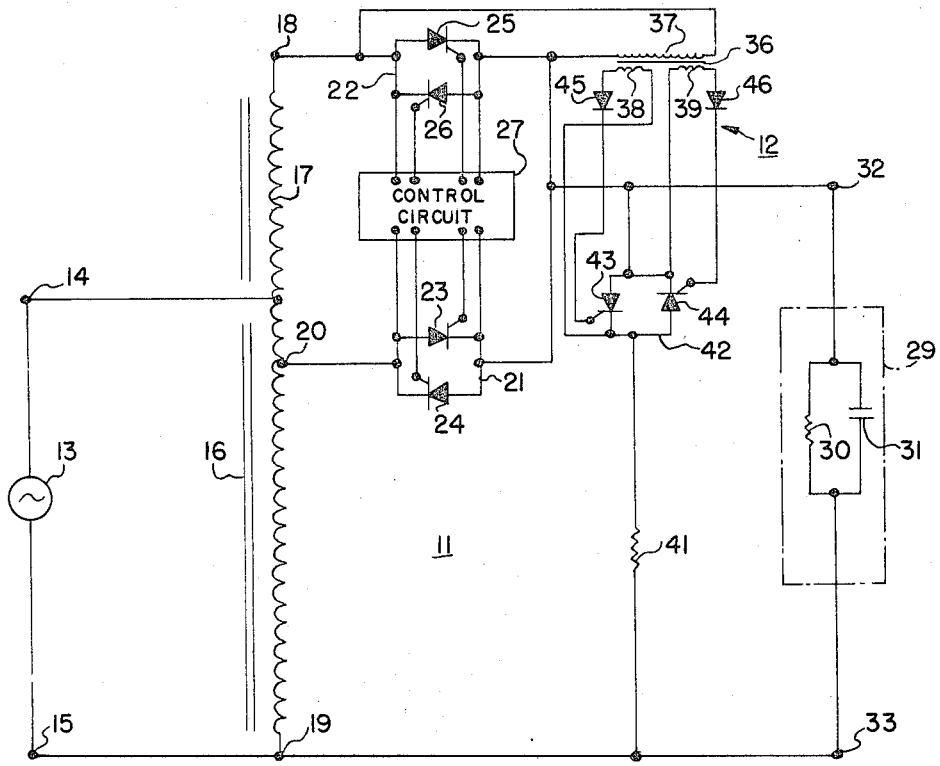
FIGURE 1 is a schematic diagram of an alternating voltage circuit incorporating the invention.

FIGURE 1 shows a regulator circuit 11 which incorporates the invention. This regulator circuit is one example of a circuit operable from an alternating voltage source or operable with an alternating current load which may utilize the leading current circuit 12 of the invention. The regular circuit 11 is operable from an alternating voltage source 13 connected to input terminals 14 and 15. An autotransformer 16 has taps connected to these terminals 14 and 15 and has a secondary winding 17 with first, second and third terminals 18, 19 and 20, with the third terminal 20 being of a potential intermediate that of the other two terminals 18 and 19. First and second pairs of rectifiers 21 and 22 are connected to the third and first terminals 20 and 18, respectively. Each pair of rectifiers contains first and second rectifiers connected in parallel opposition, or back-to-back. The first pair of rectifiers 21 includes controlled rectifiers 23 and 24 and the second pair of rectifiers 22 includes rectifiers 25 and 26. These may be controllable rectifiers such as semi-conductor controlled rectifiers for control of the voltage or current supplied to a load 29. This load is shown as including a resistor 30 and a capacitor 31 in order to illustrate a load requiring a leading current. The load 29 has load terminals 32 and 33. The first pair of rectifiers 21 is connected to conduct current between the third source terminal 20 and the load terminal 32 and the second pair of rectifiers 22 is connected to conduct current between the first source terminal 18 and the load terminal 32. The second load terminal 33 is connected to the source terminal 19.

A means responsive to reversal of load current is illustrated as a voltage responsive means or transformer 36 having a primary winding 37 connected across the second pair of rectifiers 22. This transformer 36 has secondary winding means illustrated as secondary windings 38 and 39. A bleeder impedance or bypass impedance is illustrated as a bleeder resistor 41. A third pair of controllable rectifiers 42 includes rectifiers 43 and 44 connected in parallel opposition or back-to-back. The bleeder resistor 41 is connected in series with this third pair of rectifiers 42 and connected across the load 29.

The first and second pairs of rectifiers 21 and 22 may be controlled by a control circuit 27 which is connected to the gates and cathodes of each of these controlled rectifiers.

The third pair of rectifiers 42 is controlled from the secondary windings 38 and 39. The first secondary winding 38 is connected through a protective diode 45 across the gate and cathode of the rectifier 43. The second secondary winding 39 is connected through a protective diode 46 to the gate and cathode of the rectifier 44.

*Operation*

The regulator circuit 11 is one example of a circuit operable from an alternating current source or usable with an alternating current load which may use the leading current circuit 12 of the invention. The regulator circuit 11 is one which may regulate a condition of the load 29 such as voltage or current. If it is a closed loop system, then a condition of the load such as terminal voltage or current may have connections back to the control system 27 to control the first and second pairs of rectifiers 21 and 22.

Figure 3:
FIGURES 3 through 8 are graphs of voltage and current explaining the circuit operations.

FIGURE 3 helps to explain the operation of the circuit of FIGURE 1. The first pair of rectifiers 21 is connected to a lower voltage terminal 20 than is the second pair of rectifiers 22. FIGURE 3 shows a voltage $E_{20}$ which is the voltage at the third terminal 20 and another voltage $E_{18}$, the voltage at the first terminal 18. At the beginning of the positive half cycle of the voltage at these terminals 18 and 20 the control system 27 gives a signal to fire the first rectifier 23 and hence the voltage applied to the load follows the voltage curve $E_{20}$. At some point in time shown as point 50, in this instance shown at about the 60 degree point, the third rectifier 25 is fired. This applies a higher voltage to the load 29 and this higher voltage is applied to the cathode of the rectifier 23 to automatically extinguish conduction through this rectifier 23. On the negative half cycle the rectifier 24 is the first to conduct for a first portion of this half cycle and then the control system 27 fires the rectifier 26 to again increase the voltage applied to the load 29. The solid line curve 51 is thus the curve of load voltage which is theoretically applied to the load 29 and the dotted line curve 52 is a curve of the load current which is theoretically applied to the load 29. The term theoretical is used above because with this particular load 29 requiring a leading current, there is a point 53 in each half cycle at which the leading current reverses but the applied voltage has not yet reversed. This is shown at about the 150 degree point in each half cycle, as an example of a leading current.

Figure 4:
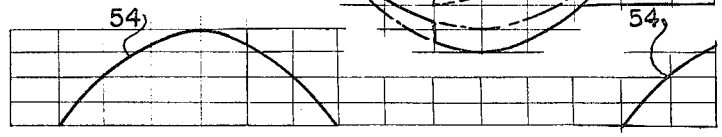
Figure 5:
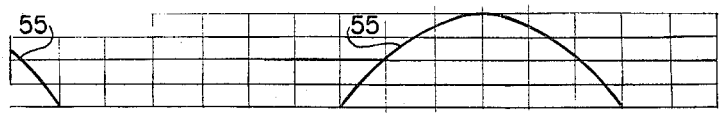
Figure 6:
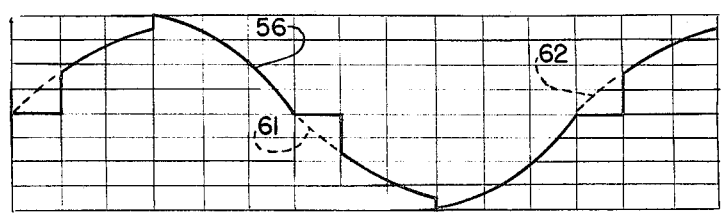
Figure 7:
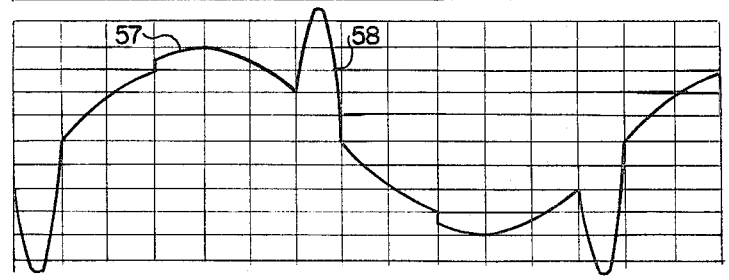

FIGURE 4 illustrates curves 54 of the possible firing times for the controlled rectifiers 23 and 25 and FIGURE 5 illustrates curves 55 for the possible firing time of the rectifiers 24 and 26. FIGURE 6 illustrates a solid line curve 56 of the load current which is allowed to flow according to the gate signals applied to the controlled rectifiers 23–26. FIGURE 7 illustrates a curve 57 of the actual load voltage applied to load 29 through the rectifiers 23–26 and showing voltage peaks 58 or the voltage rise during each half cycle due to the current interruption. This current interruption is due to the fact that at point 53, the load current needs to reverse, yet the voltage is still positive on the anode of the rectifier 25. Rectifier 23 has conducted for the first 60 degrees of this cycle and rectifier 25 has conducted for the next 90 degrees of this half cycle. Then at point 53, the 150 degree point in this example, it is not possible to apply a gate signal to fire the rectifier 24, in order to carry this reversing load current. The reason it is not possible to fire rectifier 24 at this time is that this would cause a short circuit between the transformer taps 18 and 20 and around through the rectifiers 24 and 25. Also if one were to apply a signal to the rectifier 26, to try to carry this reverse current prior to the voltage zero time, this would have the rectifier 26 conducting when the voltage did reverse at the 180 degree point and hence rectifier 26 would continue to conduct for the entire next half cycle. This would result in a full-on loss of control or forward failure condition. Accordingly it will be seen that none of the rectifiers 23–26 may be fired at this current reversing point and hence if the leading current circuit 12 were not provided, the load voltage would rise in peaks at 58 as shown in FIGURE 7.

Figure 8:
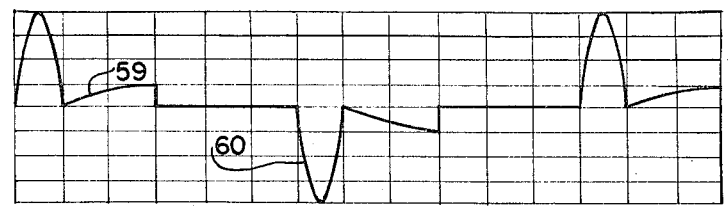

FIGURE 8 shows a curve of voltage 59 which is the possible voltage across the second pair of rectifiers 22. This voltage rises at the first portion of each half cycle because of the voltage between terminals 18 and 20. However when the rectifier of the second pair 22 fires, then the voltage thereacross is practically zero for the next 90 degrees of this half cycle. Then at a time corresponding to the voltage peaks 58 there is a voltage rise 60 across this second pair of rectifiers 22 which is the voltage used to turn on the rectifiers 43 and 44. This firing of the rectifiers 43 and 44 in the latter portion of each half cycle permits current to flow from the load through the bleeder resistor 41. The dotted line portion 61 in the curve of FIGURE 6 is the load current which is caused to flow through the rectifier 43 and bleeder resistor 41, and the dotted line portion 62 in this curve of FIGURE 6 is the load current caused to flow through rectifier 44 and the bleeder resistor 41 in the negative half cycle. Where the bleeder resistor 41 is made of an impedance equal or substantially equal to the impedance of the load 29, then the load 29, acting at that time as a voltage source, will force a load current through the bleeder resistor 41 which is substantially equal to the normally expected sinusoidal load current, and hence a generally sinusoidal load current will actually flow in the load 29.

Figure 2:
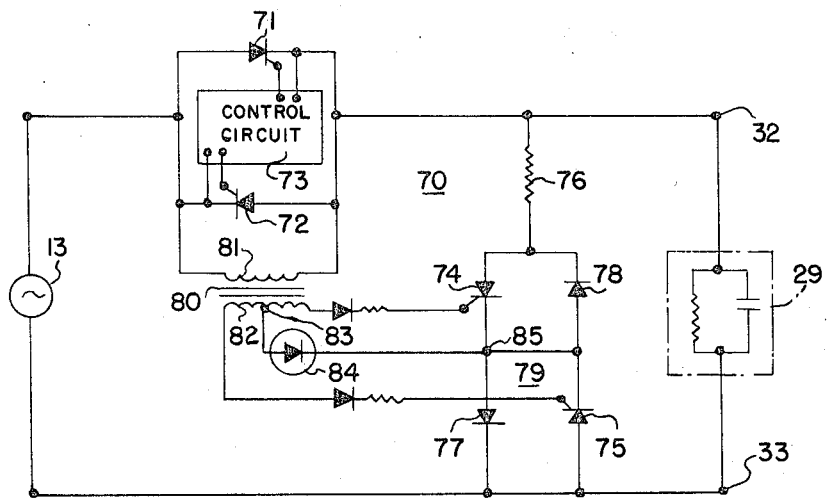
FIGURE 2 is a schematic diagram of a modification of the invention.

FIGURE 2 shows a simplified alternating current circuit 70 operable from an alternating voltage source 13 and supplying an alternating voltage to a load 29. In this circuit 70 only one pair of controllable rectifiers is used which includes rectifiers 71 and 72. These may be semi-conductor controlled rectifiers as controlled by a control circuit 73 supplying a firing signal to the gate and cathode of these rectifiers 71 and 72.

The load 29 is again shown as one requiring a leading current. Third and fourth controlled rectifiers 74 and 75 are connected in parallel opposition and this combination connected in series with a bleeder impedance 76, with the series combination being connected across the load 29 between the load terminals 32 and 33. Protective diodes 77 and 78 are connected in series with the controlled rectifiers 74 and 75, respectively, and poled to conduct current in the same direction as the respective controlled rectifiers.

A leading current circuit 79 includes a load current reversal sensing means, again shown as a voltage sensing transformer 80 having a primary 81 connected across the parallel connected rectifiers 71 and 72. This transformer 80 has a secondary 82 with a mid-tap 83. One end of the secondary 82 is connected through a protective diode and a current limiting resistor to the gate of the controlled rectifier 74, and the other end of the secondary 82 is similarly connected to the gate of the controlled rectifier 75. The mid-tap 83 is connected through a Zener diode 84 to a common junction 85 between the recifiers 74 and 77 and the rectifiers 75 and 78.

Operation

The alternating current circuit 70 operates in a manner similar to that described for the circuit of FIGURE 1. The control circuit 73 controls the firing angle of the controled rectifiers 71 and 72 to control the current or voltage supplied to the load 29. If desired a feedback connection may be made from the load to the control circuit 73 for a closed loop system. The load 29 is shown as one requiring a leading current and again the voltage and current diagrams of FIGURES 3 to 8 are generally applicable, at least in the latter portion of each half cycle. The leading current circuit 79 again provides a path or a bypass for the load current through a voltage dropping means in the latter portion of each half cycle in order to maintain substantially sinusoidal load current in the load 29. Again assuming that the current leads the voltage by 30 degrees, a point 53 will be reached as shown in FIGURE 3 wherein the load current attempts to reverse but the voltage supply is still positive. This will be current through the rectifier 71. If the rectifier 72 were to be triggered into conduction by the control circuit 73 at this point 53, then this rectifier 72 would be conducting at the instant of voltage reversal and hence the rectifier 72 would continue to conduct for this negative half cycle. Accordingly this would be the full on or uncontrolled firing, with full voltage supplied to the load 29. Thus the regulator circuit would fail to function as a regulator. The leading current circuit 79 provides a path for this current during the latter portion of each half cycle. The voltage sensing transformer 80 senses the voltage rise such as shown at 60 in FIGURE 8 and this voltage rise is applied to the gates of the rectifiers 74 or 75 to fire these rectifiers. This conducts the leading current through the bleeder resistor 76 for this latter portion of each half cycle. The Zener diode 84 clips off any small pips of voltage which might tend to fire the rectifiers 74 or 75.

Figure 9:
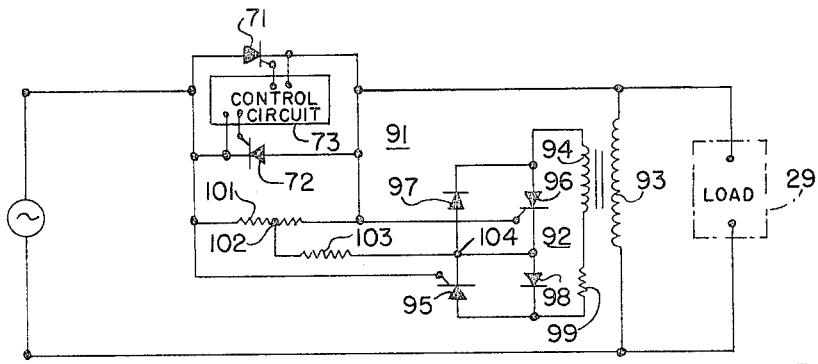
FIGURES 9 through 11 are schematic diagrams of additional modifications incorporating the invention.

FIGURE 9 is a modified regulator circuit 91 which incorporates rectifiers 71 and 72 in a manner similar to the circuit of FIGURE 2. These rectifiers 71 and 72 supply controlled current to the load 29 which requires a leading current. A leading current circuit 92 is included in the regulator circuit 91 and includes a transformer having a primary 93 connected across the load 29. This transformer has a secondary 94 connected to opposedly connected controllable rectifiers 95 and 96. Rectifiers 97 and 98 are connected in series with the controllable rectifiers 95 and 96, respectively. A bleeder resistor 99 is connected in series combination of the transformer secondary 94 and the opposedly connected rectifiers are 95 and 96.

A current reversal sensing means is provided in the circuit 91 and includes a resistor 101 connected across the rectifiers 71 and 72. This resistor has a mid tap 102 which is connected through a current limiting resistor 103 to a common junction 104 between all four rectifiers 95–98. The gates or control elements of the rectifiers 95 and 96 are connected to the opposite ends of the resistor 101.

Operation

The circuit of FIGURE 9 operates in a manner similar to the circuit of FIGURE 2. The rectifiers 71 and 72 supply controllable energy to the leading current load 29. At some point late in each half cycle, the load current reverses while one of the rectifiers 71 and 72 still has a positive voltage applied on the anode thereof. It is at this time that the resistor 101 will sense this reversal of current. A voltage will be built up across this resistor 101 to fire the appropriate one of the rectifiers 95 or 96. This will establish a conducting path through the transformer secondary 94 and bleeder resistor 99. This low impedance path will be reflected into the transformer primary 93 to permit load current to reverse and continue to flow during this latter portion of each half cycle.

FIGURE 10 again shows rectifiers 71 and 72 supplying energy to the load 29 in a regulator circuit 106. The circuit 106 includes a leading current circuit 107 which includes a transformer having a primary 108 and secondary 109. The primary 108 is connected in series with the bleeder resistor 99 across the load 29. The transformer secondary 109 has a mid tap 110 and controllable rectifiers 111 and 112 are connected to conduct current from the respective ends of the secondary 109 to the mid tap 110. Current limiting resistors 113 and 114 connect the ends of the resistor 101 to the gates of the rectifiers 111 and 112 respectively and the mid tap 102 is connected to the mid tap 110.

Operation

Figure 10:
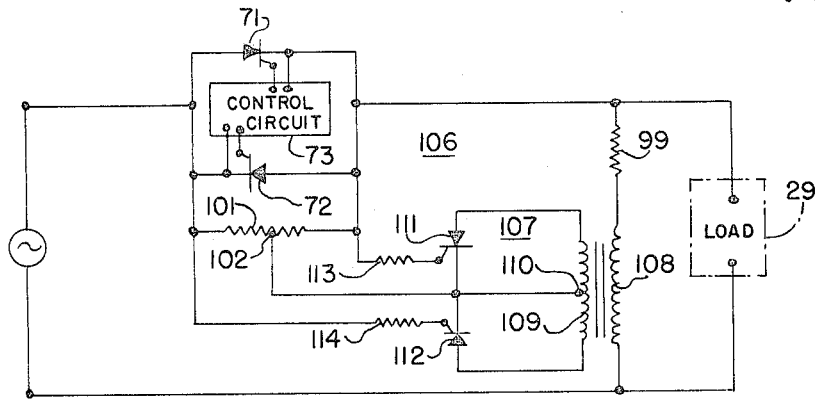

The circuit of FIGURE 10 operates in a manner similar to that of FIGURE 9. In the latter portion of each half cycle, as the leading current reverses, a sensing voltage will be built up across resistor 101 to fire the appropriate one of rectifiers 111 and 112. This will establish a conducting path for one-half of the secondary 109 which will be essentially short circuited by the appropriate rectifier. This low impedance current path will be reflected into the transformer primary 108 to establish current flow from the load through the bleeder resistor 99 and primary 108 during this latter portion of each half cycle. This will again maintain continuity of current flow in the load which will be substantially sinusoidal assuming that the bleeder impedance is of the proper value in accordance with the transformer ratios.

Figure 11:
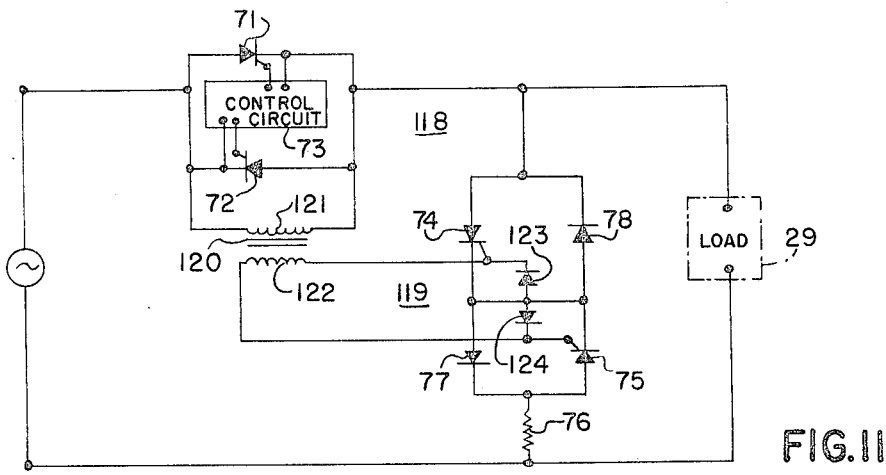

FIGURE 11 shows a still further modification of a regulator circuit 118. This circuit 118 includes a leading current circuit 119. Circuit 119 includes a sensing transformer 120 having a primary 121 connected across the main rectifiers 71 and 72. The transformer has a secondary 122 connected to fire rectifiers 74 and 75. These rectifiers are controllable rectifiers connected in parallel opposition. Rectifiers 77 and 78 are connected in series with the rectifiers 74 and 75, respectively, and this parallel combination of rectifiers is connected in series with the bleeder resistor 76 across the load 29. Half wave blocking diodes 123 and 124 are connected across the gate and cathode of the rectifiers 74 and 75.

Operation

The circuit of FIGURE 11 operates in a manner similar to that shown in FIGURE 2. When the leading current attempts to reverse late in each half cycle, the sensing transformer 120 applies a voltage to fire the appropriate rectifier 74 or 75. This establishes a current path from the load through the bleeder resistor 76.

The half wave blocking diodes 123 and 124 provide a shunting of the gate-to-cathode firing signals so that only reverse voltages which occur during the normal "forward" half cycle can trigger the rectifier 74 or 75.

It has been found that the bleeder resistor such as resistor 41 in FIGURE 1 does not absorb any appreciable amount of power. In FIGURES 3 through 8 an example has been shown of a load current leading the load voltage by 30 degrees. One might then assume that this bleeder resistor would absorb one-sixth of the total power but in practice it has been found this power absorption is far less. Assume a load voltage of 100 volts and a current of 100 amperes. With this condition one wants a bleeder resistor of 1 ohm. If the bleeder resistor were connected on a continuous basis with 180 degree conduction on each half cycle then this would dissipate $100 \times 100 = 10,000$ watts and reduce the circuit efficiency to less than 50%.

Using the system described above the resistor carries current for only 30 degrees and the losses therein are $I_{rms}^2 R$.

RMS current is given by:

$$RMS = \sqrt{\frac{\int_a^b f^2(t)\,dt}{b-a}}$$

In this example $$I_{rms} = 100\sqrt{\frac{\int_{5/6\pi}^{\pi} \sin^2 \omega t\, d\omega t}{2\pi - 0}} + \sqrt{\frac{\int_{11/12\pi}^{2\pi} \sin^2 \omega t\, d\omega t}{2\pi - 0}}$$

$$= 100\sqrt{\frac{2\int_{5/6\pi}^{\pi} \sin^2 \omega t\, d\omega t}{2\pi}}$$

$$= 11.85 \text{ amperes}$$

The watts loss in the resistor is then $(11.85)^2 \times 1 = 141$ watts. This is $$\frac{141}{10{,}000} \times 100 = 1.41\%$$

loss, compared to 100% when the bleeder is operated continuously. It is also important that these amperes are not supplied by the main rectifiers 23–26 but by the load. If the bleeder were connected all the time the main rectifiers 23–26 would carry twice normal current for all except 30 degrees of each half cycle.

The figures of the drawing show that the leading current circuit may be applied to any alternating current circuit for operation of a load from an alternating voltage source means from which is derived first and second voltages of different magnitude or from which is derived a controllable voltage supplied to the load, and means is provided to connect the voltage source means to the load including a controlled rectifier or unidirectional conducting means. The leading current circuit 12 or 79 provides a bypass through some impedance means or voltage drop so as to maintain substantially continuous current flow through the load even though this current may not flow backwardly through the main controlled rectifiers to the voltage source.

The circuits of FIGURES 1, 2 and 11 have the bleeder resistors connected directly across the load through the appropriate rectifier which is at that time firing. FIGURES 9 and 10 have the bleeder resistor connected effectively across the load in accordance with the impedance of a transformer, and this impedance is determined by the firing of a controllable rectifier in the leading current circuit. In all of the circuits there is a transformer to provide isolation between the voltage source and the load so that load current is not permitted to flow between the source and the load through the rectifiers of the leading current circuit.

In the circuits of FIGURES 9 and 10 the impedance of the bleeder resistor 99 may not be exactly or substantially equal to the impedance of the load 29. The impedance of the bleeder resistor in these cases should be selected to maintain substantially sinusoidal load current, taking into account the transformation ratio between primary and secondary of the transformer connected across the load. The circuits of FIGURES 9 and 10 have an advantage in that low voltage rating semi-conductor controlled rectifiers may be used in the leading current circuits 92 and 107. This often permits economies in choice of suitable rectifiers.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A leading current circuit comprising, in combination, first and second terminals,
    (a) means to energize said terminals from an alternating voltage source at different potentials,
    (b) first and second unidirectional conducting means,
    (c) first and second load terminals,
    (d) means to connect a load requiring a leading current between said first and second load terminals,
    (e) means connecting said first and second unidirectional conducting means to conduct current alternatively from said first and second terminals to said load terminals,
    (f) voltage dropping means,
    (g) third unidirectional conducting means,
    (h) means responsive to the voltage across one of said first and second unidirectional conducting means,
    (i) circuit means interconnecting said voltage dropping means, said third unidirectional conducting means and said load terminals,
    (j) and means connecting said voltage responsive means to control the conduction of said third unidirectional conducting means in the latter portion of each half cycle as the voltage across the load increases to a value greater than the voltage between said first and second terminals to establish current flow in said voltage dropping means in accordance with current flow in the load.

2. A leading current circuit comprising, in combination, first and second terminals,
    (a) means to energize said terminals from an alternating voltage source at different potentials,
    (b) first and second unidirectional conducting means,
    (c) first and second load terminals,
    (d) means to connect a load requiring a leading current between said first and second load terminals,
    (e) means connecting said first and second unidirectional conducting means to conduct current alternatively from said first and second terminals to said load terminals,
    (f) third and fourth unidirectional conducting means,
    (g) means responsive to the reversal of current in the load,
    (h) means connecting said current responsive means to control the conduction of said third and fourth unidirectional conducting means in the latter portion of each half cycle as the current reverses in the load,
    (i) a bleeder impedance,
    (j) circuit means interconnecting said third and fourth unidirectional conducting means, said bleeder impedance and said load terminals,
    (k) and means including said third and fourth unidirectional conducting means to establish current flow through said bleeder impedance in accordance with load current flow in the latter portion of each half cycle.

3. A circuit as claimed in claim 2, including,
    (k) a third terminal,
    (l) means to energize said third terminal from said source at a different potential,
    (m) and another pair of unidirectional conducting means connected to said third terminal and to one of said load terminals to conduct current from said third terminal to said one of said load terminals.

4. A circuit as claimed in claim 2, including,
    (k) a transformer as said current responsive means,
    (l) said transformer having a primary winding connected across said first unidirectional conducting means and having a center-tapped secondary winding,
    (m) and means including said secondary winding to control the conduction of said third and fourth unidirectional conducting means.

5. A circuit as claimed in claim 2, including, (k) a transformer in said circuit means and having a primary and a secondary winding, (l) means connecting said primary winding across said load terminals, (m) and means connecting said secondary winding in series with said bleeder impedance and the combination of said third and fourth unidirectional conducting means.

6. A circuit as claimed in claim 2, including, (k) a transformer in said circuit means having a primary and a secondary winding, (l) means connecting said bleeder impedance in series with said primary winding across said load terminals, (m) and means connecting said third and fourth unidirectional conducting means to said secondary winding.

7. A circuit as claimed in claim 2, including, (k) a transformer as said current responsive means, (l) said transformer having a primary winding connected across said first unidirectional conducting means and having a secondary winding with only two terminals thereon, (m) and means including said secondary winding to control the conduction of said third and fourth unidirectional conducting means.

8. A leading current circuit comprising, in combination, (a) first and second terminals, (b) means to energize said terminals from an alternating voltage source at different potentials, (c) first and second unidirectional conducting means, (d) first and second load terminals, (e) means to connect a load requiring a leading current between said first and second load terminals, (f) means connecting said first and second unidirectional conducting means to conduct current alternatively from said first and second terminals to said load terminals, (g) impedance means, (h) controllable means, (i) circuit means interconnecting said controllable means, and said impedance means and said load terminals, (j) and means to control said controllable means to establish current flow through said impedance means in accordance with load current flow in the latter portion of each half cycle.

9. A leading current circuit comprising, in combination, (a) first and second terminals, (b) means to energize said terminals from an alternating voltage source at different potentials, (c) first and second unidirectional conducting means, (d) first and second load terminals, (e) means to connect a load requiring a leading current between said first and second load terminals, (f) means connecting said first and second unidirectional conducting means to conduct current alternatively from said first and second terminals to said load terminals, (g) a bleeder impedance, (h) third unidirectional conducting means, (i) means connecting said third unidirectional conducting means effectively in series with said bleeder impedance across the load, (j) means responsive to the voltage across one of said first and second unidirectional conducting means, (k) and means connecting said voltage responsive means to control the conduction of said third unidirectional conducting means in the latter portion of each half cycle as the voltage across said load increases to a value greater than the voltage between said first and second terminals.

10. A leading current circuit comprising, in combination, (a) first and second terminals, (b) means to energize said terminals from an alternating voltage source at different potentials, (c) first and second unidirectional conducting means, (d) first and second load terminals, (e) means to connect a load requiring a leading current between said first and second load terminals, (f) means connecting said first and second unidirectional conducting means to conduct current alternatively from said first and second terminals to said load terminals, (g) a bleeder impedance, (h) third and fourth unidirectional conducting means, (i) means connecting said third and fourth unidirectional conducting means effectively in opposition and in series with said bleeder impedance across the load, (j) means responsive to the voltage across said first and second unidirectional conducting means, respectively, (k) and means connecting said voltage responsive means to control the conduction of said third and fourth unidirectional conducting means in the latter portion of each half cycle as the voltage across the load increases to a value greater than the voltage between said first and second terminals.

11. A leading current circuit comprising, in combination, (a) first and second terminals, (b) means to energize said terminals from an alternating voltage source at different potentials, (c) first and second rectifiers, (d) first and second load terminals, (e) means to connect a load requiring a leading current between said first and second load terminals, (f) means connecting said first rectifier to conduct current from said first terminal to one of said load terminals, (g) means connecting said second rectifier to conduct current from said second terminal to one of said load terminals, (h) a bleeder resistor, (i) third and fourth rectifiers connected in opposition, (j) means connecting said third and fourth rectifiers in series with said bleeder resistor and across said load terminals, (k) means responsive to the voltage across said first and second rectifiers, respectively, (l) and means connecting said voltage responsive means to control the conduction of said third and fourth rectifiers to have said third and fourth rectifiers conduct current in the latter portion of each half cycle as the voltage across said load terminals increases to a value greater than the voltage between said first and second terminals.

12. A leading current circuit, comprising, in combination, (a) first and second terminals, (b) means to energize said terminals at different potentials from an alternating voltage source, (c) first and second rectifiers, (d) first and second load terminals, (e) means to connect a load requiring a leading current between said first and second load terminals, (f) means connecting said first rectifier to conduct current from said first terminal to one of said load terminals, (g) means connecting said second rectifier to conduct current from said second terminal to one of said load terminals, (h) a bleeder resistor having an impedance substantially equal to said load, (i) third and fourth rectifiers connected in opposition, (j) means connecting said third and fourth rectifiers in series with said bleeder resistor and across said load terminals, (k) first and second means responsive to the voltage across said first and second rectifiers, respectively, (l) and first and second unidirectional conducting means connecting said first and second voltage responsive means to control the conduction of said third and fourth rectifiers, respectively, to have said third and fourth rectifiers conduct current in the latter portion of each half cycle as the voltage across said load terminals increases to a value greater than the voltage between said first and second terminals to fire said third and fourth rectifiers on alternate half cycles to establish a conduction path for said leading current in the latter portion of each half cycle from said load terminals and through said bleeder resistor.

13. A leading current circuit for an alternating voltage circuit, comprising, (a) in combination, first and second terminals, (b) means to energize said terminals at different potentials from an alternating voltage source, (c) first and second rectifiers, (d) first and second load terminals, (e) means to connect a load requiring a leading current between said first and second load terminals, (f) means connecting said first rectifier to conduct current from said first terminal to one of said load terminals, (g) means connecting said second rectifier to conduct current from said second terminal to one of said load terminals, (h) a bleeder resistor having an impedance substantially equal to said load, (i) third and fourth rectifiers connected in parallel opposition, (j) means connecting said third and fourth rectifiers in series with said bleeder resistor and across said load, (k) voltage sensing transformer means having first and second secondary winding means responsive to the voltage across said first and second rectifiers, respectively, (l) and means connecting said first and second secondary winding means to control the conduction of said third and fourth rectifiers to have said third and fourth rectifiers conduct current late in each half cycle as the voltage across said load increases to a value greater than the voltage between said first and second terminals to fire said third and fourth rectifiers on alternate half cycles to establish a conduction path for said leading current late in each half cycle from said load and through said bleeder resistor.

14. A leading current circuit for an alternating voltage circuit, comprising, in combination, (a) first and second terminals, (b) means to energize said terminals at different potentials from an alternating voltage source, (c) first and second certifiers, (d) first and second load terminals, (e) means to connect a load requiring a leading current between said first and second load terminals, (f) means connecting said first rectifier to conduct current from said first terminal to one of said load terminals, (g) means connecting said second rectifier to conduct current from said second terminal to one of said load terminals, (h) voltage sensing transformer means having first and second secondary winding means responsive to the voltage across said first and second rectifiers, respectively, (i) a bleeder resistor having an impedance substantially equal to said load, (j) third and fourth rectifiers connected in parallel opposition, (k) means connecting said third and fourth rectifiers in series with said bleeder resistor and across said load, (l) unidirectional conducting means connecting said first secondary winding means to control the conduction of said third rectifier, (m) and unidirectional conducting means connecting said second secondary winding means to control the conduction of said fourth rectifier, to have said third and fourth rectifiers conduct current late in each half cycle as the voltage across said load increases to a value greater than the voltage between said first and second terminals to fire said third and fourth rectifiers on alternate half cycles to establish a conduction path for said leading current late in each half cycle from said load and through said bleeder resistor.

15. A leading current circuit for a regulatable circuit, comprising, in combination, (a) first, second and third terminals, (b) means to energize said terminals from an alternating voltage source at different potentials with said third terminal having an intermediate potential, (c) a load terminal, (d) first and second rectifiers, (e) means connecting said first rectifier between said first terminal and said load terminal, (f) means connecting said second rectifier between said third terminal and said load terminal, (g) means to connect a load requiring a leading current between said second terminal and said load terminal, (h) means to selectively control conduction through said first and second rectifiers to regulate one of voltage and current supplied to said load, (i) voltage sensing transformer means having secondary winding means responsive to the voltage between said first terminal and said load terminal, (j) a bleeder resistor having an impedance substantially equal to said load, (k) a third rectifier means connecting said third rectifier and said bleeder resistor in series between said load terminal and said second terminal, (l) and unidirectional conducting means connecting said secondary winding means to control the conduction of said third rectifier, to have said third rectifier conduct current in the latter portion of a half cycle as the voltage across said load increases to a value greater than the voltage at said first terminal to fire said third rectifier to establish a conduction path for said leading current from said load and through said bleeder resistor.

16. A leading current circuit for an alternating voltage regulatable circuit, comprising in combination, (a) first and second terminals, (b) means to energize said terminals from a voltage source at different potentials, (c) first and second rectifiers connected in parallel opposition as a first pair of rectifiers, (d) a load terminal, (e) means connecting said first pair of rectifiers between said first terminal and said load terminal, (f) means to connect a load requiring a leading current between said second terminal and said load terminal, (g) means to control conduction through said first pair of rectifiers to regulate one of voltage and current supplied to said load, (h) voltage sensing transformer means having first and second secondary winding means responsive to the voltage between said first terminal and said load terminal, (i) a bleeder resistor having an impedance substantially equal to said load, (j) third and fourth rectifiers connected in parallel opposition between said load terminal and said second terminal through said bleeder resistor, (k) unidirectional conducting means connecting said first secondary winding means to control the conduction of said third rectifier, (l) and unidirectional conducting means connecting said second secondary winding means to control the conduction of said fourth rectifier, to have said third and fourth rectifiers conduct current late in each half cycle as the leading load current attempts to reverse before the load voltage reverses and the voltage across said load increases to a value greater than the voltage at said first terminal to fire said third and fourth rectifiers on alternate half cycles to establish a conduction path for said leading current late in each half cycle from said load and through said bleeder resistor so that the current through said load is essentially sinusoidal.

17. A leading current circuit for an alternating voltage regulatable circuit, comprising, in combination,
(a) first, second and third terminals,
(b) means to energize said terminals from a voltage source at different potentials with said third terminal having an intermediate potential,
(c) first and second rectifiers connected in parallel opposition as a first pair of rectifiers and third and fourth rectifiers connected in parallel opposition as a second pair of rectifiers,
(d) a load terminal,
(e) means connecting said first pair of rectifiers between said first terminal and said load terminal,
(f) means connecting said second pair of rectifiers between said third terminal and said load terminal,
(g) means to connect a load requiring a leading current between said second terminal and said load terminal,
(h) means to selectively control conduction through said first pair and said second pair to regulate one of voltage and current supplied to said load,
(i) voltage sensing transformer means having first and second secondary winding means responsive to the voltage between said first terminal and said load terminal,
(j) a bleeder resistor having an impedance substantially equal to said load,
(k) fifth and six rectifiers connected in parallel opposition between said load terminal and said second terminal through said bleeder resistor,
(l) unidirectional conducting means connecting said first secondary winding means to control the conduction of said fifth rectifier,
(m) and unidirectional conducting means connecting said second secondary winding means to control the conduction of said sixth rectifier, to have said fifth and sixth rectifiers conduct current late in each half cycle as the leading load current attempts to reverse before the load voltage reverses and the voltage across said load increases to a value greater than the voltage at said first terminal to fire said fifth and sixth rectifiers on alternate half cycles to establish a conduction path for said leading current late in each half cycle from said load and through said bleeder resistor so that the current through said load is essentially sinusoidal.

18. A leading current circuit for an alternating voltage regulatable circuit, comprising, in combination,
(a) a transformer having a secondary winding with first and second taps and an intermediate third tap,
(b) first and second semiconductor controlled rectifiers connected in parallel opposition as a first pair of rectifiers and third and fourth semiconductor controlled rectifiers connected in parallel opposition as a second pair of rectifiers,
(c) a first terminal,
(d) means connecting said first pair of rectifiers between said first tap and said first terminal,
(e) means connecting said second pair of rectifiers between said third tap and said first terminal,
(f) means to connect a load requiring a leading current between said second tap and said first terminal,
(g) means to selectively control conduction through said first pair and said second pair to regulate one of voltage and current supplied to said load,
(h) voltage sensing transformer means having first and second secondary winding means responsive to the voltage between said first tap and said first treminal,
(i) a bleeder resistor having an impedance substantially equal to said load,
(j) fifth and sixth semiconductor controlled rectifiers connected in parallel opposition between said first terminal and said second tap through said bleeder resistor,
(k) unidirectional conducting means connecting said first secondary winding means across the gate and cathode of said fifth rectifier,
(l) and unidirectional conducting means connecting said second secondary winding means across the gate and cathode of said sixth rectifier, to have said fifth and sixth rectifiers conduct current late in each half cycle as the leading load current attempts to reverse before the load voltage reverses and the voltage across said load increases to a value greater than the voltage at said first tap to fire said fifth and sixth rectifiers on alternate half cycles to establish a conduction path for said leading current late in each half cycle from said load and through said bleeder resistor so that the current through said load is essentially sinusoidal.

19. A leading current circuit for a voltage regulator, comprising, in combination,
(a) a transformer having a secondary winding with first and second taps and an intermediate third tap,
(b) first and second semiconductor controlled rectifiers connected in parallel opposition as a first pair of rectifiers and third and fourth semiconductor controlled rectifiers connected in parallel opposition as a second pair of rectifiers,
(c) a first terminal,
(d) means connecting said first pair of rectifiers between said first tap and said first terminal,
(e) means connecting said second pair of rectifiers between said third tap and said first terminal,
(f) means to connect a load requiring a leading current between said second tap and said first terminal,
(g) means to selectively control conduction through said first pair and said second pair to regulate the voltage supplied to said load,
(h) a voltage sensing transformer having a primary winding connected between said first tap and said first terminal,
(i) first and second secondary windings on said voltage sensing transformer,
(j) a bleeder resistor having an impedance substantially equal to said load,
(k) fifth and sixth semiconductor controlled rectifiers connected in parallel opposition between said first terminal and said second tap through said bleeder resistor,
(l) rectifier means connecting said first secondary winding across the gate and cathode of said fifth rectifier,
(m) and rectifier means connecting said second secondary winding across the gate and cathode of said sixth rectifier, to have said fifth and sixth rectifiers conduct current late in each half cycle as the leading load current attempts to reverse before the load voltage reverses and the voltage across said load increases to a value greater than the voltage at said first tap to fire said fifth and sixth rectifiers on alternate half cycles to establish a conduction path for said leading current late in each half cycle from said load and through said bleeder resistor so that the current through said load is essentially sinusoidal.

References Cited

UNITED STATES PATENTS

| | | | |
|---|---|---|---|
| 3,281,652 | 10/1966 | Perrins | 323—43.5 |
| 3,275,929 | 9/1966 | Schatz | 323—43.5 |
| 3,263,157 | 7/1966 | Klein | 323—43.5 |
| 3,195,038 | 7/1965 | Fry | 323—25 |
| 3,146,392 | 8/1964 | Sylvan | 323—24 |
| 3,040,239 | 6/1962 | Walker | 323—24 |

JOHN F. COUCH, *Primary Examiner.*

H. HUBERFELD, *Assistant Examiner.*